United States Patent [19]
Ow

[11] 3,779,574
[45] Dec. 18, 1973

[54] RETRACTABLE WHEEL ASSEMBLY
[75] Inventor: Gordon Y. W. Ow, Alexandria, Va.
[73] Assignee: Go-Craft Systems, Inc., Honolulu, Hawaii
[22] Filed: Jan. 12, 1972
[21] Appl. No.: 217,211

Related U.S. Application Data
[62] Division of Ser. No. 883,157, Dec. 8, 1969, abandoned.

[52] U.S. Cl. ............................................ 280/43.18
[51] Int. Cl. .......................................... B62d 21/18
[58] Field of Search .................... 280/43.17, 43.18, 280/43.19, 43.23, 124 A

[56] References Cited
UNITED STATES PATENTS
2,807,381  9/1957  Tegeler ........................... 280/43.19
2,784,424  3/1957  Southerland .................... 280/43.23
2,766,050  10/1956  Stone .............................. 280/43.23
2,806,710  9/1957  Mascaro ......................... 280/43.23

Primary Examiner—Robert R. Song
Attorney—Lowe & King

[57] ABSTRACT

A family of vehicles for operation on land or in water are provided wherein the frame is external and mates with the bottom of the body by engaging elongated channels formed therein. The frame serves to support the retractable wheel assemblies and the detachable pontoons whereby stress and strain is isolated from the body. Resilient pad means is provided to cushion the engagement of the assembly. A tongue for attachment to a draft vehicle is slidably retractable so as to be out of the way during marine operations; the auxiliary ground supporting wheel and jackscrew being positioned in a horizontal position. The ground engaging wheels are mounted by compact and independently operating retractable mechanism including leaf and coil springs and a shock absorber which enable easy selection and assembly of conponent parts essential for wide range of load requirements of the family of vehicles; the compact design being enhanced by positioning of the main or leaf spring and the coil springs/-shock absorber on opposite sides of the wheel suspending action lever. Latch means is provided to hold the assembly in the ground engaging position with hydraulic cylinder means serving to retract the wheels when desired. The wheel retracting mechanism is supported by a spindle which extends from the side of the frame to maintain the uncluttered and compact design of the assembly.

The present invention relates broadly to a family of vehicles having component parts adapted to mate and work together for efficient operation on both land and sea, and more particularly, to a retractable wheel assembly for such vehicles.

12 Claims, 14 Drawing Figures

INVENTOR,
GORDON Y.W. OW
BY Lowe & King
ATTORNEYS

PATENTED DEC 18 1973

INVENTOR,
GORDON Y. W. OW

BY
Lowe & King
ATTORNEYS

INVENTOR,
GORDON Y.W. OW
BY Lowe & King
ATTORNEYS

RETRACTABLE WHEEL ASSEMBLY

This is a divisional application of my copending application Ser. No 883,157, entitled "Amphibious Vehicle," filed Dec. 8, 1969, now abandoned.

BACKGROUND OF THE INVENTION

With the amount of leisure time of persons increasing from year to year, many families are finding the answer to spending such leisure time by taking up camping and boating activities. However, the average family has been limited to the selection of either one or the other of the activities due to the high cost and generally unsuitable design of amphibious vehicles presently on the market, or the obvious prohibitiveness of the price if separate land and water vehicles are considered. Indeed, it has been found that most prior attempts to improve the design and lower the cost of the recreational vehicle have been directed to the structures of boats alone or of campers alone whereby the development of improvements in combination or amphibious vehicles has been neglected. Such a result has thus left the average purchaser or family without a vehicle suitable to enjoy both boating and camping, or for the sportsman without a vehicle suitable to participate in other outings, such as overnight hunting and fishing trips.

Thus, it is a main consideration to provide an improved design for a family of amphibious vehicles, which design is simple in construction and thus low in cost, but efficient in operation on both land and water and a main object of the invention is to provide a new and efficient retractable wheel assembly that greatly enhances the design.

BRIEF DESCRIPTION OF THE INVENTION

The combination vehicles of the present invention do offer the desirable features of simplicity of manufacture coupled with stability and functional excellence. Preferably, the body or hull of the vehicle is molded of fiberglass so as to be a unitary and watertight structure. The bottom of the body is formed with a plurality of elongated channels which are patterned to receive in mating relationship an external frame assembly. The frame thus serves to desirably reinforce the body of the vehicle whereby the need for internal reinforcement as has been used in the past is substantially eliminated. Also of equal importance is the fact that the frame is thereby completely recessed in the bottom so as to present a smooth and uncluttered surface for substantially reducing the drag in the water.

Most importantly, with the external frame feature, the support pontoons and the retractable wheel assemblies may be mounted directly on the frame and completely apart from the body whereby torsional and flexure stresses are not transferred to or through the latter. Further, with the external frame, low water drag and watertight body features, the body of said amphibious vehicles when emersed in water provide a portion of the bouyant forces in conjunction with pontoons. Thereby, the size of said pontoons may be significantly reduced over that which would normally be required to support the body of the vehicle above the surface of the water as is common practice. Thus, handling of the pontoons are made sufficiently easier with the relatively reduced size while the higher speed catamaran and stability features of the pontoon are retained.

To greatly simplify production of a family of vehicles, the frame and retractable wheel assembly is of a standard configuration and can be fit on the bottom of any vehicle configuration whether it be in the conventional form of a houseboat, travel trailer, camping trailer, open utility boat, platform catamaran, boat trailer or simply a utility trailer.

The pontoons are made readily detachable by mounting of a tubular holder along one portion of the frame by an S-shaped arm. An attaching bracket and girth-encircling band are provided in addition to hold the pontoon in a fixed position for stability. The retractable wheel assembly is mounted by spindles attached to the frame as opposed to a transverse axle extending across the frame to minimize drag during marine operations. Preferably, the spindle is mounted by a T-shaped block with a unique reinforcing bracket backing up the block for strength and stability under load during land operations. To further reduce drag and for appearance, the tongue for attachment to a draft vehicle is slidably mounted in the frame for retraction and also for rotation through 90° to position the auxiliary wheel and cooperating jackscrew in a horizontal position during the marine operations.

The compactness of the retracting mechanism for the ground engaging wheels is an important feature of novelty with respect to this aspect of this aspect of the present invention. This allows the wheels to be retracted into a very limited side indentation or recess formed in the side of the body or hull while at the same time assuring that the necessary load supporting stability is received. The retracting function is gained through a pivotal arm, which works rotatably in conjunction with the suspension action lever. A leaf spring is mounted beneath and substantially parallel to the action lever to prevent interference with other component parts and is connected to the free end of the action lever for maximum leverage. On the opposite side of said lever is mounted the shock absorber with additional load supporting coil spring for cushioning action and sharing of ground engaging load of said leaf spring. The shock absorber and coil spring form one side of a substantially equilateral triangle whereby maximum leverage and efficiency is also obtained from this component part, thereby contributing to the compactness of the retracting mechanism.

Therefore, it is from the above brief description, able to be seen, that a broad object of the present invention is to provide a new wheel assembly adapted for family of amphibious vehicles.

It is still another object of the present invention to provide a family of amphibious vehicles with an external frame and retractable wheel mechanism which provides a minimum amount of drag during marine operations.

It is another object of the present invention to provide a retractable wheel assembly that is easily assembled to carry a wide range of loads and that is compact and yet is characterized by stability and road shock absorbing efficiency.

Still other objects and advantages of the present invention will become readily apparent to those skilled in this art from the following detailed description, wherein I have shown and described only the preferred embodiments of the invention, simply by way of illustration of the best modes contemplated by me of carrying out my invention. As will be realized, the invention is capable of other and different embodiments, and its several details are capable of modifications in various obvious respects, all without departing from the invention. Accordingly, the drawings and description are to be regarded as illustrative in nature, and not as restrictive.

DETAILED DESCRIPTION OF THE INVENTION

Figure 1:
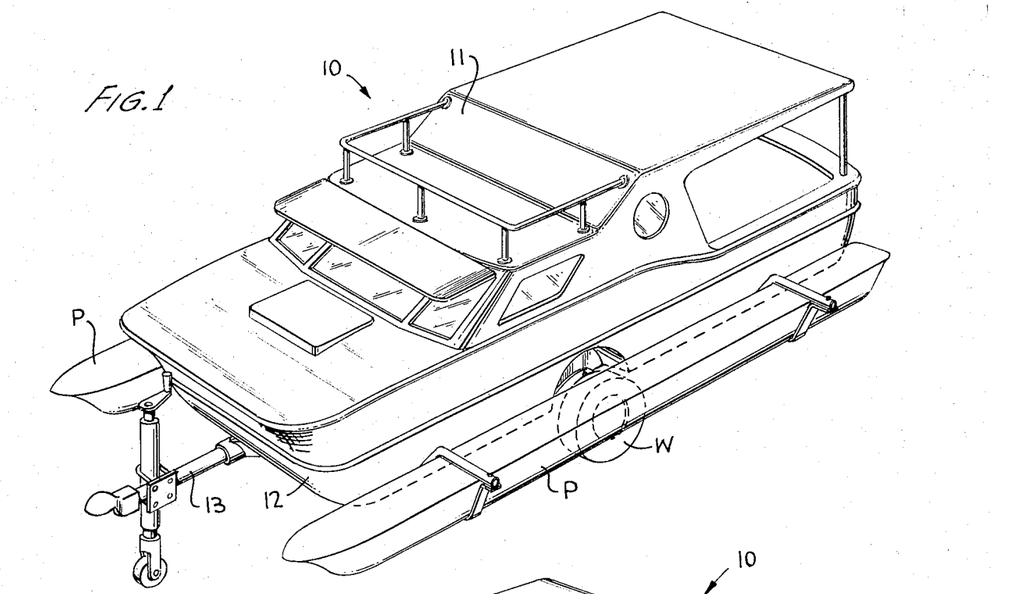
FIG. 1 is an overall perspective view of an amphibian vehicle with houseboat and travel trailer characteristics and constructed in accordance with my design.
Figure 2:
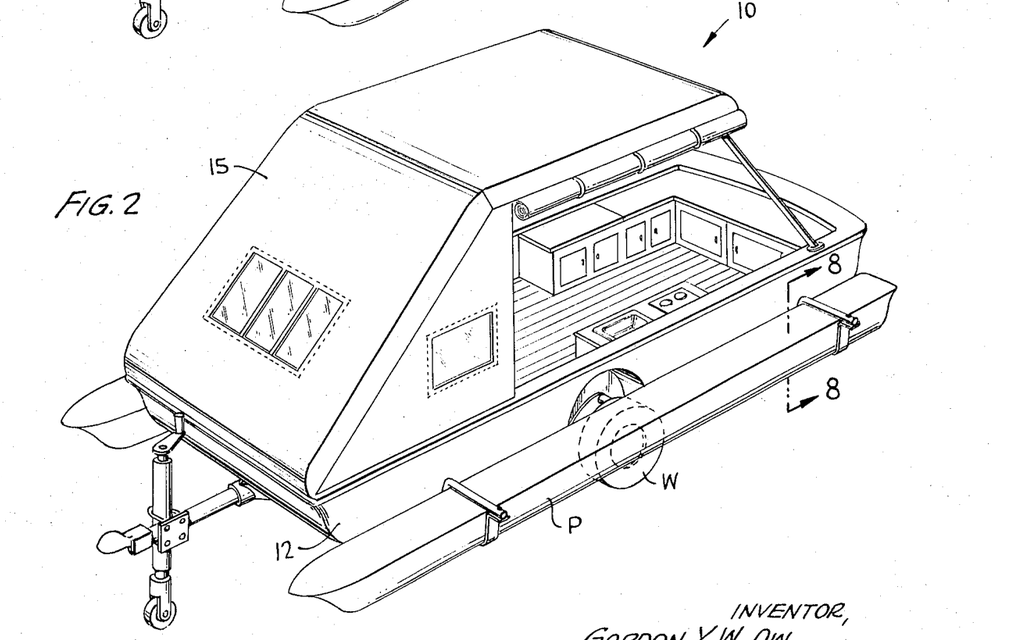
FIG. 2 is an overall perspective view of another form or member of the family of vehicles characterized by camping trailer features.

With reference now to FIGS. 1 and 2, a more detailed description of the preferred embodiments can be made for a fuller understanding thereof. Thus, the family of vehicles envisioned may be headed by an amphibious vehicle assembly 10 embodying dominant outside characteristics of a houseboat and travel trailer 11 having a body or hull 12 which is shaped so as to be particularly adapted for marine operations. The vehicle assembly 10 includes a pair of pontoons P, one along each side, to support at all times during marine operations at least a portion of the weight of the assembly 10. For conversion to land operation, a pair of wheels W are also provided at the sides, which, as will be seen later, are extensible to the ground engaging position; the pontoons being removable at the same time for this mode of operation, as will also be seen later in detail. The forward end or the bow of the assembly 10 is provided with a tongue 13 for attachment to a draft vehicle for the land operating mode.

As will be readily recognized, the vehicle assembly 10 of FIG. 2 shows a second member of the family, which is characterized by a camping trailer outfit 15. The same dominant characteristics including the pontoons P for marine operations and the retractable wheels W for land operations are provided.

Figure 3:
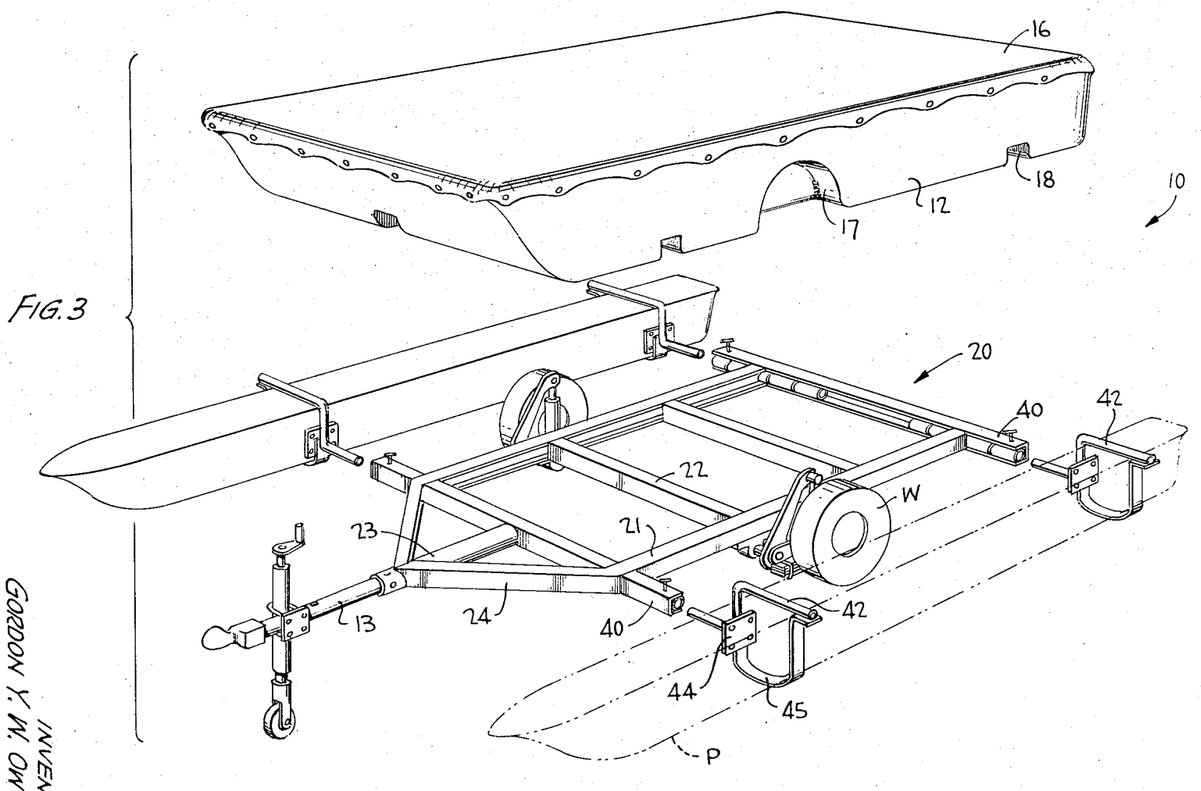
FIG. 3 is an exploded perspective view of the amphibious vehicle assembly utilizing a utility body.

A third member of the family and one which will be utilized to describe the features of the design more in detail is shown in an exploded view in FIG. 3. The body 12 of the assembly 10 in this instance can be simply described as being for utility purposes. The body 12 is preferably formed of molded fiberglass, as is the preferred case in the first two members of the family; however, it is to be understood that any other types of suitable construction or material may be used. The entire body 12 is essentially identical to the lower body or hull 12 of the embodiments of FIGS. 1 and 2, which offers obvious economic advantages in terms of mass production for the family of vehicles. In any case, the body 12 is formed to be watertight so that the same may be used as a small utility or fishing boat in marine embodiments. Of course, when on land, the body 12 is suitable for use as a container for material whereupon the vehicle assembly 10 becomes analogous to a conventional utility trailer. If desired, a suitable cover 16 may be provided over the top of the body 12 in the usual manner when not in use. Molded into the sides of the body 12 are wheel indentions 17 (only one shown in FIG. 3, the other side being identical) to receive the wheels W when positioned in the retracted position, as shown in this figure. Molded in the bottom of the body 12 is a network of elongated channels 18 which serve a very important function in the operation, as will presently appear.

Figure 4:
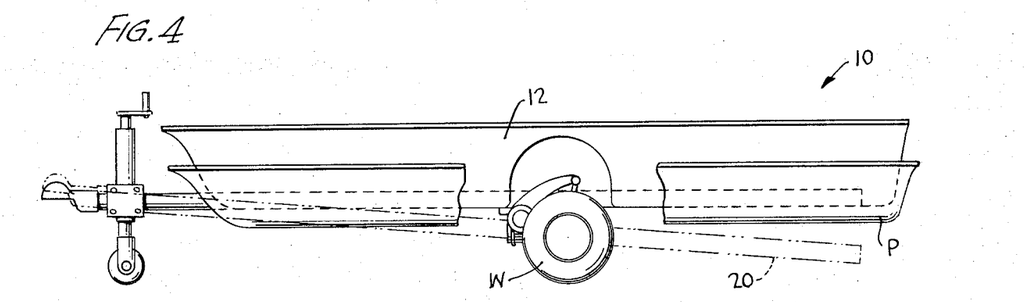
FIG. 4 is a side view of the vehicle assembly shown in FIG. 3 setup for land operations.

The showing of FIG. 4 is descriptive of the land operation of the assembly 10 and illustrative of the invention wheel assembly features. The wheel W is in the extended position so that the body 12 is supported above the ground surface. If however it is desired to lower the body 12 for loading or unloading purposes the wheel W is merely retracted in a manner which will be seen later in order to lower the framework 20 to the dotted line position shown.

In the marine environment, the pontoons P are set down below the bottom of the body 12 so as to take the major portion of the weight of the assembly 10 and keep the external framework 20 firmly pushed up against the body 12. Also with the pontoons P thus positioned below the bottom, the body 12 will be raised out of the water when the boat is moving forward at sufficient speed to plane. As such, the framework 20 is raised from the water and the drag of the water on the craft is greatly reduced.

In order to greatly simplify the construction of the vehicle assembly 10 whether it be in the form of houseboat or travel trailer 11, the camping trailer 15, or the utility unit, the interior of the body 12 is formed with little or no reinforcement. This allows for not only less expensive construction of the body 12 but also allows conservation of useable space inside the craft. A framework, generally designated by the reference numeral 20, is provided which has both longitudinal frame members 21 and transverse frame members 22, preferably welded together, to form a complete network for reinforcement of the body 12. It will be understood that the network of recessed channels 18 corresponds to the framework 20 so that when the body 12 is placed on said framework 20 the two component parts mate together. Substantial further economy of manufacturing is gained by forming each body 12 of the family with the same network pattern and the frame 20 of the same configuration since only one bottom mold and one welding jig are required for the respective operations.

Figure 6:
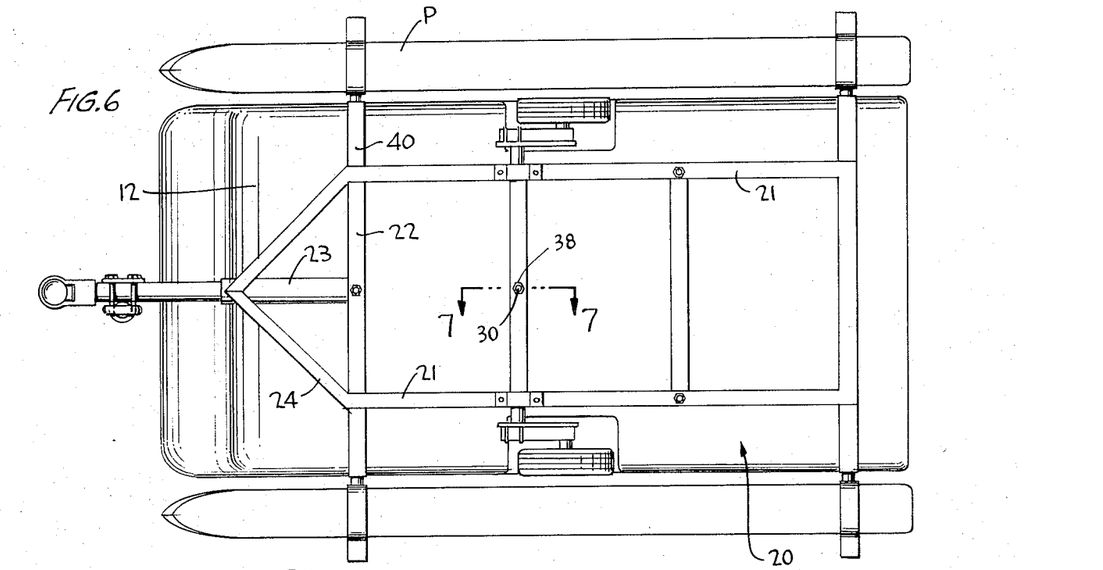
FIG. 6 is a bottom view of the vehicle assembly illustrated in FIGS. 1–5.

At the bow of the craft, the framework 20 is provided with a tubular holder 23 which is positioned by an additional and V-shaped frame member 24. As shown in FIG. 6 the framework 20, including each of the frame members 21, 22 and 24, and the tubular holder 23, covers the entire bottom of the body 12 and is completely positioned inside the network of channels 18, thereby giving the necessary reinforcement across the full expanse of the bottom under all conditions.

Figure 7:
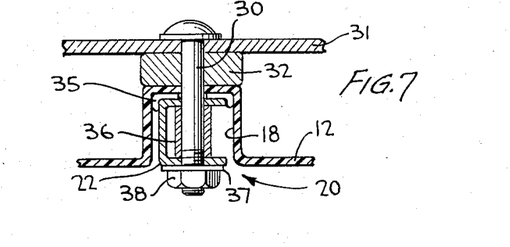
FIG. 7 is a cross-sectional view taken along line 7—7 of FIG. 6 illustrating the preferred fastening means for said assembly.

In accordance with the preferred design or embodiment, the framework 20 is securely fastened to body 12 by a plurality of bolts 30, as best shown in FIGS. 6 and 7. One specific form this feature can take (see FIG. 7) includes the bolts 30 passing through a flooring 31 positioned above the body 12 by a suitable spacer and sealing grommet 32. The spacer 32 is, as clearly shown in FIG. 7, confined to the area above the network of channels 18 which, as stated before and as shown in this figure, matingly accommodates the frame member 22. Since the bearing point for the flooring 31 is thus over the framework 20 and said framework 20 is always reacting upwardly, either by virtue of the pontoon P or the wheels W, it can be seen that little or no additional internal reinforcing structure is necessary, thus giving the interior of the craft greatly expanded and uncluttered useable space. The framework 20 fits flush with the bottom surface of the body 12 to minimize drag during marine operations prior to attaining planing speed of the craft.

The mating engagement between the body 12 and the framework 20 is or may be cushioned by the positioning of a resilient pad 35 along the upper wall of the recessed channels 18. This pad 35, which may be formed of any suitable plastic or rubber material, is resistant to deterioration in the water and serves to further seal the body 12 around the bolt 30. However, the pad 35 has as its main function to prevent the framework 20, (which is usually made of metal, such as steel) from rubbing against the body 12, which, as will be remembered, is made of fiberglass, thereby preventing deleterious wearing which would otherwise occur. As illustrated in FIG. 7, the pad 35 preferably extends down along the side walls of the recessed network of channels 18 so that the individual frame members 21, 22 and 24 are also kept spaced away from the body 12 in the horizontal plane. When mated together, the framework 20, having both longitudinal and transverse components (the frame members 21, 22, respectively), prevents shifting in all directions in the horizontal plane which give unexcelled stability and reinforcement potential for the body 12.

The frame members 21, 22, 24 of the framework 20 are preferably fabricated in a channel cross-sectional shape to give maximum strength while at the same time maintaining one side open for drainage, and thus eliminating the problem of corrosion and rust from trapped water. As exemplarily shown in FIG. 7, the frame member 22, receives the fastening bolt 30 through each of its horizontally extending flanges; a tubular spacer 36 spanning the distance between the flanges to prevent the same from collapsing. To complete the fastening assemblage, a washer 37 and nut 38 are provided. The positioning of fastening assemblages 30, 33 on two transverse frame members 22 and on each of the longitudinal frame members 21, as shown in FIG. 6, is deemed to be sufficient to gain the objectives of this invention; however, additional assemblages 30, 38 may be positioned at critical locations around the framework 20, as is found to be necessary or desirable.

Figures 8, 9, 10:
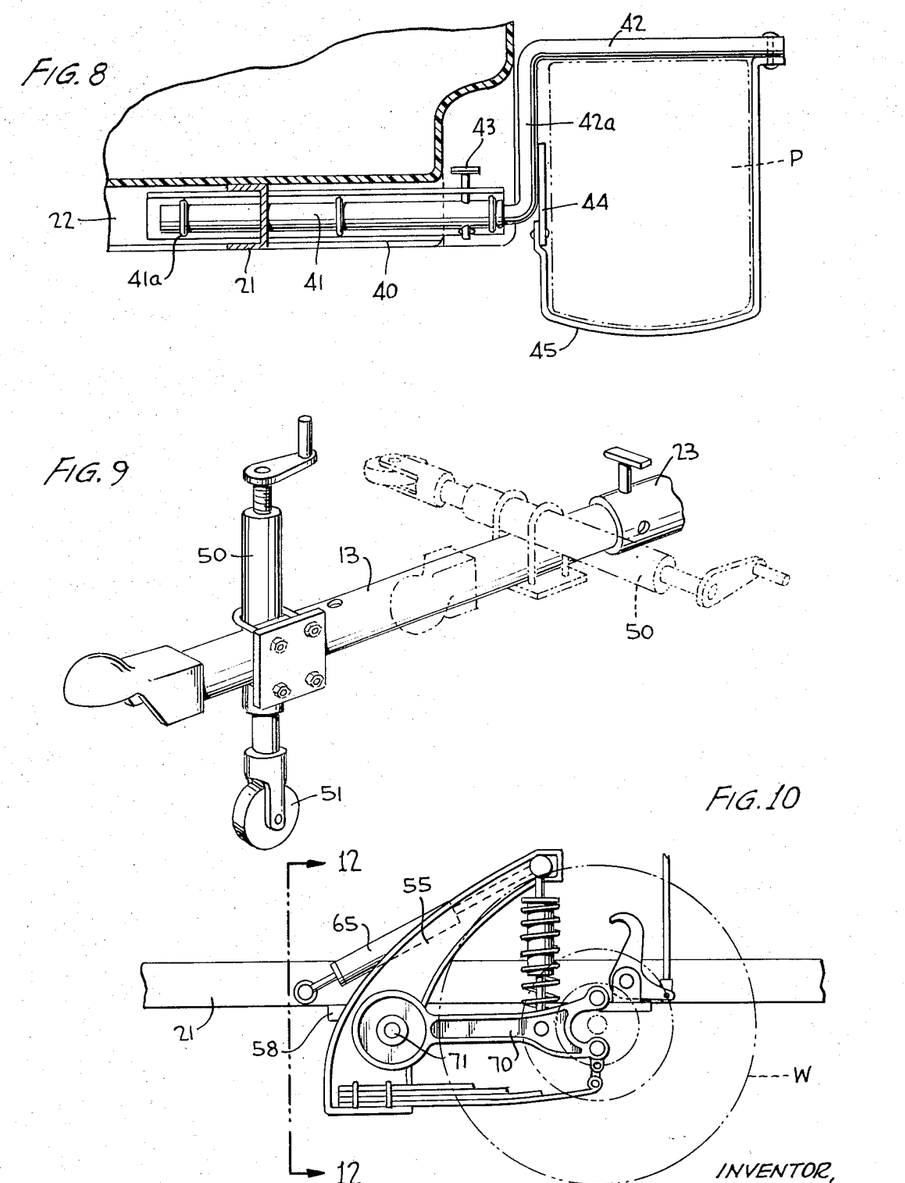
FIG. 8 is a detailed view along line 8—8 of FIG. 2 illustrating the preferred manner of attaching a pontoon to the assembly.
FIG. 9 is a cutaway perspective view of the slidably retractable tongue for attachment to a draft vehicle.
FIG. 10 is a side view of the retracting mechanism for the ground engaging wheel according to the invention and shown in the retracted position.

The framework 20 includes extensions 40 at the four corners thereof. These four extensions 40 (two on each side) are for the purpose of assisting mounting the pontoons P in a novel manner such that they are securely fastened in position during marine operations, but are quickly detachable when converting to land operations in order to keep the sides of the assembly 10 within the space requirements for travel on the highways. To do this, a tubular receiver 41 is mounted along each extension 40, as best shown in FIG. 8, and preferably extends through the longitudinal frame members 21 for an additional distance along the transverse frame members 22. The tubular receiver 41 is securely mounted along its entire length by a plurality of U-bolts 41a although it is to be understood that other means of fastening, such as by welding along the length of the receiver 41, may be employed if desired.

Fitting inside the tubular receiver 41 is a pontoon supporting arm 42 (see FIGS. 3 and 8) which is substantially S-shaped in configuration. The middle portion of the S-shaped arm 42 is indicated by the reference numeral 42a and extends up along the adjacent side of the pontoon P in supportive relationship thereto. The upper portion of the arm 42 extends along the top of the pontoon P also in supporting relationship. The arm 42 is adapted to be received in locking relationship with the tubular receiver 41 by placement of a suitable locking pin 43 in mating holes. Adjacent the lower bight portion of the arm 42 is provided a mounting plate 44 which is suitably welded or otherwise attached to the middle portion 42a and is provided with a suitable number of holes through which screws or similar fastening means may be passed to anchor the pontoon P. A band 45 then completes the securement of the pontoon P by extending around the remaining girth thereof from the mounting plate 44 to the free end of the arm 42 at the top of the pontoon P.

With the above securing arrangement, the pontoon P is assured of being in firm locked relationship as a part of the assembly 10 during marine operations. It should, at this point, be noted that since the arm 42 is fastened only to the external framework 20, none of the stresses normally inherent in pontoon boats is transferred to the body 12. In essence, the framework 20 isolates the stresses and strains from the body 12 so that there is eliminated any danger of leaks or cracking of the body 12 since the supporting arm 42 of the pontoons P does not in any way directly engage said body 12.

As shown best in FIGS. 3 and 9, the tongue 13 for securing the vehicle assembly 10 to a draft vehicle is provided with a suitable jackscrew device 50 having an auxiliary ground engaging wheel 51 to gain the usual improved handling qualities on land when detached from the draft vehicle. To improve the appearance and handling qualities of the assembly 10 during marine operations, the tongue 13 is to be slidably retracted into the tubular holder 23, as pointed out earlier. To do this, locking pin 52 is removed whereupon the tongue 13 is pushed back to the dotted line position. In doing so, the tongue 13 is also rotated through 90° in order to place the jackscrew device in the horizontal position. The jackscrew device 50 may thus be positioned up under the bow of the assembly 10 and can be in a position to be out of sight when operating in water. Also, being in the horizontal position, there is a complete absence of drag when the craft is cruising by planing on the pontoons P and the framework 20 is thus supported out of the water.

Figure 11:
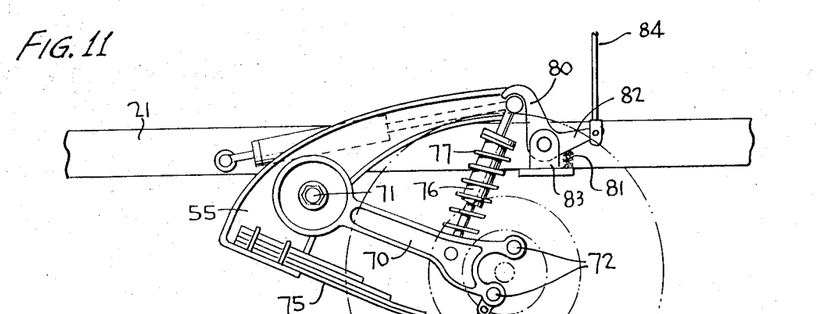
FIG. 11 is a side view of the retracting mechanism shown in FIG. 10 but in the ground engaging position.
Figures 12, 12A:
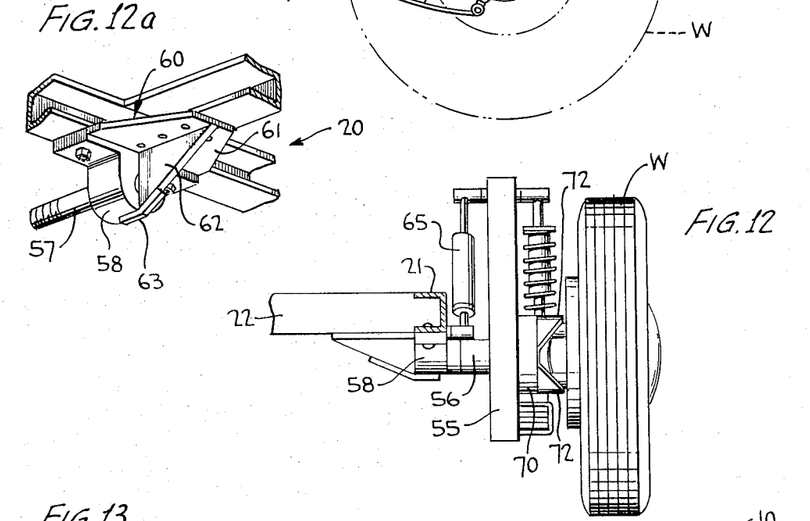
FIG. 12 is a front view of the retracting mechanism of FIGS. 10 and 11 and showing the mounting by spindle.
FIG. 12a is an enlarged perspective view of the spindle mounting for the retracting mechanism for the wheel.
Figure 13:
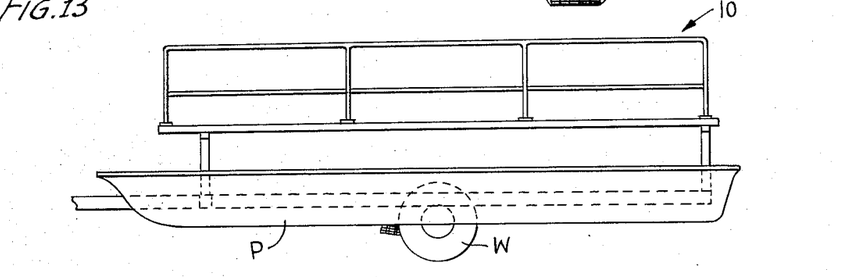
FIG. 13 is a side view illustrating one more of the several embodiments or members of the family possibly utilizing features of my design.

With reference now to FIG. 10, 11 and 12, the important feature of the vehicle assembly 10 of the present invention can be viewed and explained in detail. A pivotal support arm 55 forms the frame of a highly compact retracting mechanism for the wheel W. On the rear of the arm 55 is carried a journal 56 which is, in turn, mounted on a horizontally extending spindle 57 (see FIG. 12a) which is securely mounted to the framework 20 by a T-shaped mounting block 58. As will be realized, the use of a simple spindle arrangement of this type rather than an axle extending across the full width of the framework 20 is in accordance with the important objective of the present invention of maintaining the bottom of the craft as free as possible of drag inducing parts.

An important complementary structure that contributes to this improved mounting of the wheels W is afforded by a T-shaped mounting or attaching bracket 60 fastened to the rear of the mounting block 58, as best shown in FIG. 12a. This bracket 60 fabricated to be rigid with a horizontal plate 61 is attached to the frame 20 and with a vertical triangular brace 62 forming the leg of the T and securely fastened against the corresponding portion of the T-shaped block 58. A strap 63 is or may be attached along the outer edge of the triangular brace 62 and extending over the lower end of the block 58 in order to reinforce the complete assemblage. This backup support for the T-shaped mounting block 58 securely fastens the spindle 57 against excessive torsional and skewing action which makes possible the mounting of this nature and the elimination of the conventional transverse axle.

Figure 5:
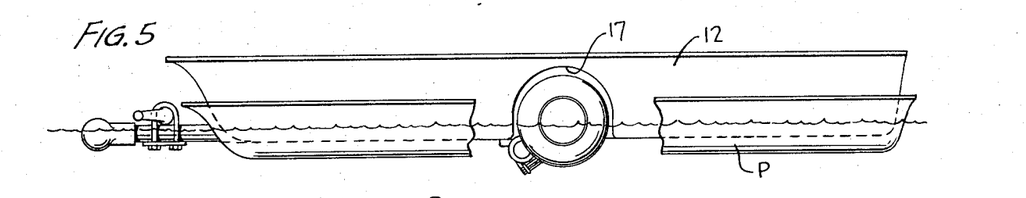
FIG. 5 is a side view of the vehicle assembly of FIG. 3 setup for marine operations.

With the arm 55 thus mounted for pivotal retracting movement, reference can now be made back to FIG. 10, wherein is shown a hydraulic cylinder 65 in the retracted position so as to position the arm 55 in the uppermost position with the wheel W positioned in the wheel recess 17 (see FIGS. 3 and 5) for marine operations. In this position, the wheel W is advantageously positioned above the water line when the vehicle is planing to carry through on the objective of minimum drag during marine operations.

The wheel W is supported by a suspension action lever 70 which is pivoted by a suitable bearing (not shown) about the horizontally extending spindle 57 (see FIGS. 12a and 12) and is held on said spindle 57 by a suitable lock nut 71. The action lever 70 and the journal 56 for the arm 55 are thus mounted coaxially on the spindle 57, but for independent pivotal movement, which enhances the compactness of the retracting mechanism. The free end of the action lever 70 may be fastened in any suitable manner to the usual wheel supporting spindle as shown in FIGS. 11 and 12, with or without a conventional brake drum assembly, such as by two mounting studs 72.

The suspension for the wheel W to bear a portion of the weight of the vehicle assembly 10 is provided by a leaf spring 75, which is fastened to the lower end of the arm 55 and pivotally attached to the free end of the action lever 70. With this arrangement and the leaf spring 75 extending substantially parallel with the lever 70, the maximum leverage for use of the spring 75 to absorb road shock is gained. Also, with this paralleling arrangement of the parts, the retracting mechanism is made more compact and confined essentially to the area of the indentation 17, thereby increasing the useful space in the body 12 (see FIGS. 5 and 10).

In order to give a cushioning effect to the action of the lever 70, there is provided another load reactive means in the form of a shock absorber 76 which is mounted on the opposite side of the lever 70 from the leaf spring 75 in order to prevent interference between the two parts. But also with this combination of shock absorber 76 and leaf spring 75 on opposite sides of the lever 70, greatly improved riding qualities are obtained in the vehicle assembly 10. This is done by gaining maximum leverage with the shock absorber 76; the latter being mounted to form one side of the substantially equilateral triangle with the arm 55 and the action lever 70. The compactness of this arrangement is again noted as being outstanding since when retracted (FIG. 10) the arm 55 neatly fits within the confines of the indentation 17 (see FIGS. 3 and 5). Thus, this improved action is gained without sacrificing valuable internal space and without using complicated structure, as has been done in the past. As may be found to be desirable and necessary with heavy loads or overweight conditions, another load reactive component, a helper spring 77, may be easily provided concentric with the shock absorber 76 to further regulate the action of the lever 70, while maintaining the compact configuration of the retractable wheel assembly. Conversely, with very light loads, it is contemplated that leaves of the leaf spring 75 are or may be selectively omitted in the assembly and spacer plates (not shown) used in place thereof when lighter members of the family of vehicles are constructed to prevent the ride from being overly stiff. Similarly, the shock absorber 76 and/or helper spring 77 are or may be replaced by appropriately sized components as dictated by the weight of the particular vehicle family member.

In order to secure the rotating mechanism in the position for land operation, there is provided a pivotal hook 80 which engages the upper mounting socket for the shock absorber 76 and/or hydraulic actuator 65 (see FIG. 11). Since the arm 55 is mounted for free pivotal movement on the spindle 57, the hook 80 is required to be designed for load bearing thus sharing this function with the spindle 57. As such, substantially reduced strain and torsional stresses are present at the mounting block 58 than would otherwise occur if an integral transverse axle and locking means were used as in certain prior art devices. The hook 80 is normally urged into the locking position by a compression spring 81 which acts between an operating lever 82 and mounting base 83 upon which the hook 80 is suitably mounted. Coupled to the operating lever 82 may be a control rod 84 which extends upwardly and through the wheel indentation 17 so that the retraction of the wheel W may be completely controlled from inside the craft.

From the foregoing, it can be seen that an improved construction of a family of amphibious vehicles has been provided which lends itself to great benefits in terms of structural integrity while utilizing mass production techniques of making the bottom of the body 12 and the framework 20 of the supporting trailer identical for the different crafts. The external framework 20 allows the body or hull 12 of the assembly 10 to be manufactured so as to minimize the need for internal framing and thereby minimize cost while maximizing useful interior space. With the retractable wheels W and the pontoons P being carried solely by the external framework 20, no deleterious stresses and strains are transmitted to the body 12 to thereby improve the life of the craft. The improved action of the retracting mechanism and the integral suspension system for the wheel W and the compactness and the adjustable load range of the same are the features that go to the attainment of the overall the specific objectives of the invention of this application.

It is contemplated that the three family members of the total disclosed combination in the form of the houseboat 11, (FIG. 1), camping unit 15 (FIG. 2), and utility unit (FIG. 3), can be expanded to any number of additional units which are found to be desirable by the purchasing public. For example, utilizing the same framework 20, the same detachable pontoons P and the same retractable wheels W the popular catamaran or platform type boat may be included in the family.

In this disclosure, there is shown and described only the preferred embodiment of the invention, but, as aforementioned, it is to be understood that the invention is capable of various changes or modifications within the scope of the inventive concept as expressed by the accompanying claims.

I claim:

1. In a vehicle adapted at least for land operation, the combination including a wheel assembly comprising a framework for said vehicle, a support arm pivotally mounted on a pivot means on said framework at a point intermediate the ends of said arm for movement about a substantially horizontal axis, an action lever mounted at one end thereof on said pivot means, a wheel rotatably mounted on the other end of said action lever, elongated spring means operatively connected between said other end of said action lever and a lower end portion of said support arm, locking means releasably engaging an upper end portion of said support arm, reactive means connected between said support arm and said action lever such that said spring means and said reactive means are positioned on opposite sides of said action lever, and actuating means for raising and lowering said wheel assembly operatively connected between said vehicle framework and said support arm.

2. The assembly of claim 1 wherein said locking means for latching said arm in the ground engaging position is mounted so as to bear a portion of the load from said wheel.

3. The retractable wheel assembly of claim 1 wherein said load reactive means comprises a shock absorber.

4. The assembly of claim 3 wherein is further provided second spring means mounted between said lever and said arm on the side of said lever occupied by said shock absorber.

5. The assembly of claim 3 wherein said shock absorber and said second spring means are coextensive substantially in the direction of the force on said wheel and form one side of a substantially equilateral triangle together with said arm and said lever, whereby increased leverage for the springing and shock absorbing action are gained.

6. The retractable wheel assembly of claim 1 wherein said first spring comprises a leaf spring unit, said leaf spring unit being positioned on the lower side of said action lever to absorb the load of said framework.

7. The retractable wheel assembly of claim 6 wherein individual leaves of said leaf spring are selectively removable to vary the load responsive characteristics of said spring.

8. The retractable wheel assembly of claim 6 wherein said leaf spring unit extends substantially parallel to said action lever and is pivotally attached to the free end of the same for maximum leverage and compactness.

9. The retractable wheel assembly of claim 6 wherein said second spring comprises a coil spring for cushioning action responsive to the road shock.

10. The retractable wheel assembly of claim 1 wherein said actuating means includes hydraulic cylinder means mounted between said frame and said arm for moving said assembly between the retracted and extended positions.

11. The retractable wheel assembly of claim 1 wherein said pivot means comprises a horizontally extending spindle, T-shaped mounting block for said spindle attached to said framework, and a rigid attachment means whereby said block is stabilized against torsional and skewing action of said wheel assembly.

12. The retractable wheel assembly of claim 11 wherein said rigid attachment means for said block includes a T-shaped reinforcement bracket and a vertical brace, said brace including a triangular plate and a reinforcement strap attached along the outer edge of said triangular plate and the lower end of said block.

* * * * *